United States Patent [19]
Huignard et al.

[11] Patent Number: 4,576,434
[45] Date of Patent: Mar. 18, 1986

[54] DEVICE FOR RECORDING A COHERENT IMAGE IN A MULTIMODE OPTICAL CAVITY

[75] Inventors: Jean P. Huignard, Paris; Henri Rajbenbach, Montrouge; Brigitte Loiseaux; Jean P. Herriau, both of Orsay, all of France

[73] Assignee: Thomson-CSF, Paris, France

[21] Appl. No.: 652,034

[22] Filed: Sep. 19, 1984

[30] Foreign Application Priority Data

Sep. 23, 1983 [FR] France ................ 83 15156

[51] Int. Cl.⁴ .................. G03H 1/16; G03H 1/28
[52] U.S. Cl. ........................... 350/3.64; 350/3.77; 350/162.12
[58] Field of Search ............ 350/3.64, 162.12

[56] References Cited

U.S. PATENT DOCUMENTS 3,632,182 1/1972 Sincerbox .

FOREIGN PATENT DOCUMENTS 2500937 9/1982 France .

OTHER PUBLICATIONS

Optics Communications, vol. 38, No. 4, Aug. 15, 1981, Huignard, et al., "Coherent Signal Beam Amplification in Two-Wave Mixing Experiments with Photorefractive Bi12SiO20 Crystals," pp. 249-254.

Applied Optics, vol. 22, No. 6, Mar. 15, 1983, Sato, et al., "Coherent Optical Image Delay Device Using a BSO Phase-Conjugate Mirror and Its Applications," pp. 815-818.

IBM Technical Disclosure Bulletin, vol. 23, No. 2, Jul. 1980, Sincerbox, et al., "System to Increase the Efficiency of the Holographic Energy Distribution for Individual Chip Replacement," pp. 831-832.

Primary Examiner—Bruce Y. Arnold
Attorney, Agent, or Firm—Pollock, Vande Sande & Priddy

[57] ABSTRACT

An optical device for storing a coherent image in a multimode cavity makes use of two interaction media in which photoinduced phase gratings are recorded. By way of example, these media are photorefractive media. A first wave designated as an object wave travels through the cavity and interferes in each of these two media with a pumping wave in order to permit energy transfer from the pumping wave to the first wave.

8 Claims, 9 Drawing Figures

DEVICE FOR RECORDING A COHERENT IMAGE IN A MULTIMODE OPTICAL CAVITY

BACKGROUND OF THE INVENTION

1. Field of the Invention

This invention relates to a device for recording a coherent image in a multimode optical cavity.

Storage of optical information in a memory is provided in a number of different forms and finds potential applications in many different fields. Among these can be mentioned the recording of two-dimensional or three-dimensional objects for safeguard purposes. Photography is the first form of optical storage but lasers have given rise to the development of new methods which are applicable in particular to the audiovisual and data-processing fields. However, although many researches have been made and commercial outlets at the present time are limited, two applications give every evidence of representing the possibilities offered by optical storage: these are holographic storage and storage of television images on video-disk.

The field of the invention is that of storage and subsequent processing of coherent images. In contrast to the two applications mentioned above, however, the specific field under consideration is that of dynamic recording of coherent images.

The device of the invention has the design function of storage and processing of an optical image based on the use of photosensitive electrooptical crystals. The operation of the device is based on energy transfer properties in dynamic holography experiments with photorefractive crystals.

2. Description of the Prior Art

A device of the prior art described in French patent application No. 82 09448 filed on May 28th, 1982 permits storage of a coherent image in a multimode optical cavity. This device comprises a coherent source which generates a signal wave and a reference wave, optical guiding means for forming a closed loop in which each signal wave circulates, an interactive amplifying medium which is placed on the path of the signal wave and on that of the reference wave. The signal wave interferes with the reference wave of said medium in order to form a diffraction grating and thus to receive energy from this reference wave. The guiding means form a multimode optical cavity, the interactive amplifying medium being placed in the Fourier plane of this cavity. A semitransparent plate is placed on the path of the signal wave in order to extract part of the energy of the multimode optical cavity.

However, this device for image storage in a cavity is attended by the following disadvantage: in this configuration which makes use of a crystal, the optical path relating to each mode of the cavity must remain equal to a multiple of this wavelength. This phase condition which corresponds to oscillation entails the need for practically perfect stigmatism for the formation of the image within the cavity.

The device in accordance with the invention makes it possible to overcome this disadvantage. In fact, it permits circulation of an optical image within a cavity by producing a transfer of information alternately from a first crystal to a second crystal. This transfer is produced simply by synchronization of two shutters.

Thus in the device of the invention there no longer exists any condition in regard to the phase since the information is stored alternately in the first crystal and then in the second crystal. The resulting effects on the constructional design of the device are highly significant. In fact, there are no longer any precise tolerances to be observed in regard to the position and quality of the optical components and lenses used in the construction of the cavity.

SUMMARY OF THE INVENTION

The invention is directed to a device for recording a coherent image in a multimode optical cavity, comprising a coherent wavelength source which generates a signal wave and optical guiding means for forming a closed loop in which the signal wave circulates, said guiding means being provided with focusing means. The distinctive feature of the invention lies in the fact that provision is made in addition for two interactive amplifying media placed on the path of the signal wave within the cavity having terminals to which are applied respectively two voltages such that the electric fields are in the direction 001 of each crystal. The coherent source delivers in addition two reference beams $P_1$ and $P_2$ which interfere with the signal wave in each of the two crystals so as to form two diffraction gratings. Provision is made for at least two shutters placed on the path of the signal wave within the cavity. Each of the two interactive media has an optimum gain coefficient. The angles formed between the signal wave and each reference beam is determined by the formula $\Lambda_i = \lambda/2 \sin \theta_i$, where $\Lambda_i$ is the pitch of the strata within the medium considered, at least one phase modulator being placed on the path of one of the reference beams. Said interactive media are placed in the vicinity of the Fourier plane of said cavity, a semitransparent plate being placed on the path of the signal wave in order to extract part of the energy of the multimode optical cavity.

BRIEF DESCRIPTION OF THE DRAWINGS

Other features of the invention will be more apparent upon consideration of the following description and accompanying drawings, wherein.

DETAILED DESCRIPTION OF THE INVENTION

Figure 2:
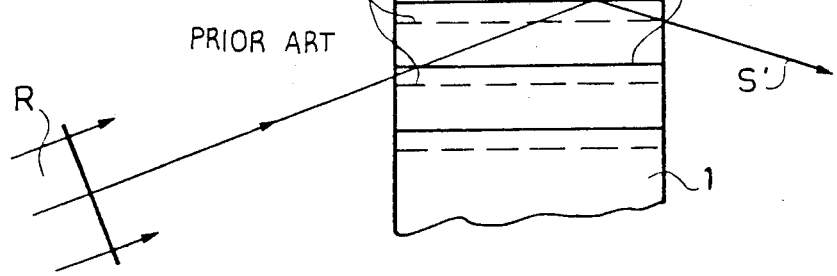
Figure 3:
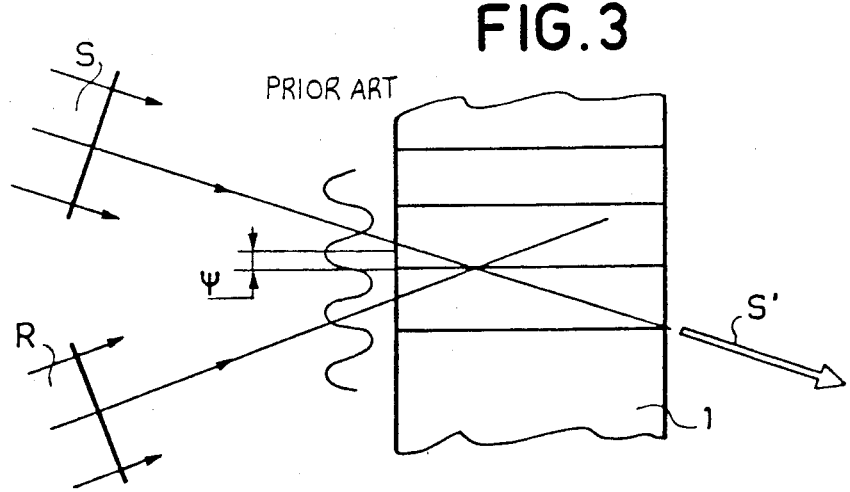

Before describing the device in accordance with the invention for storage of a coherent image within a multimode cavity by employing two amplifying media in which two waves interact, namely the object wave and a pump wave, the interaction phenomenon of the "two-wave" type will be described with reference to FIGS. 1 to 3.

Figure 4:
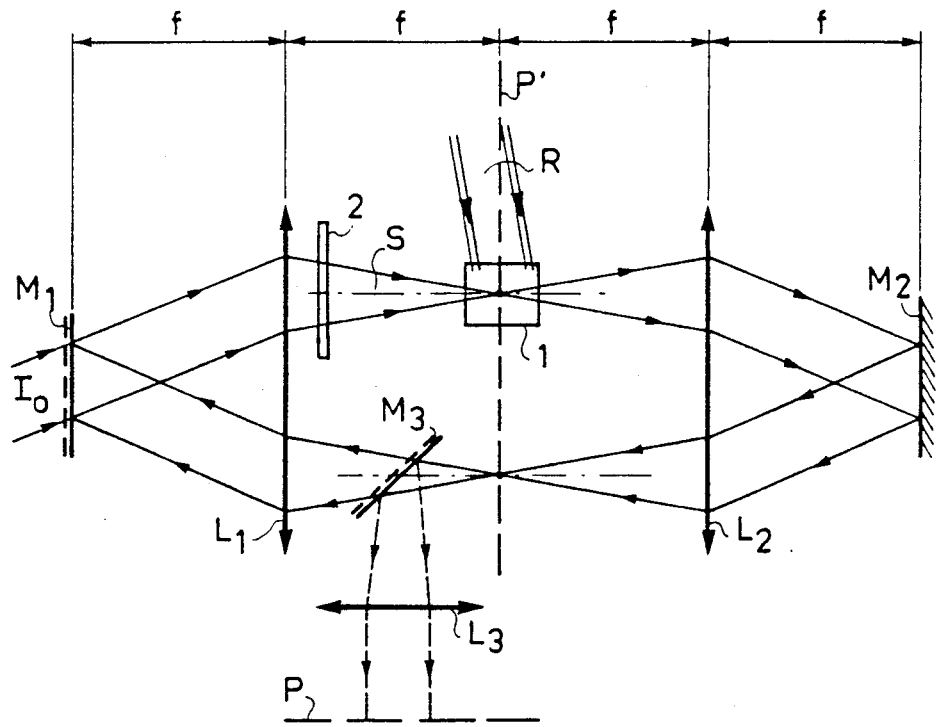
FIG. 4 illustrates a device of the prior art.

A device of the prior art which utilizes an amplification of this type is illustrated in FIG. 4. This device permits amplification of an incident radiant-energy wave by transferring the energy of a pumping beam to the signal.

The device in accordance with the invention utilizes the phenomena of wave coupling on reading of phase gratings. Consideration is therefore given to a phase grating having high diffraction efficiency and continuously recorded on a photosensitive support consisting of "thick" diffracting phase structures photoinduced by variation of refractive index in electrooptical crystals, photopolymers or whitened argentic materials.

Materials are in fact at present available for writing phase gratings or holograms having high diffraction efficiency and permitting continuous storage of information. These materials are "thick" with respect to the mean pitch of the photoinduced strata and their behavior at the time of writing and at the time of reading is described by the formalism of coupled waves governed by Bragg's equation.

In the simple case of interference of two plane waves arriving on the photosensitive support at angles of incidence $+\theta$ and $-\theta$, the spacing of the diffraction planes in the support is related to the angle $\theta$ and to the wavelength $\lambda$ by the Bragg's equation $2\Lambda \sin \theta = \lambda$. Conversely, a given grating having a pitch $\Lambda$ will significantly diffract a wavelength reading beam if it arrives on the medium at the angle $\theta$ which is related to $\lambda$ and $\Lambda$ by said Bragg's equation. A given grating constituted by parallel diffraction planes having a spacing $\Lambda$ can be re-read by a beam having a wavelength $\lambda'$. It is only necessary to adjust its angle of incidence $\theta'$ in such a manner as to satisfy the Bragg condition, namely $2\Lambda \sin \theta' = \lambda'$.

Figure 1:
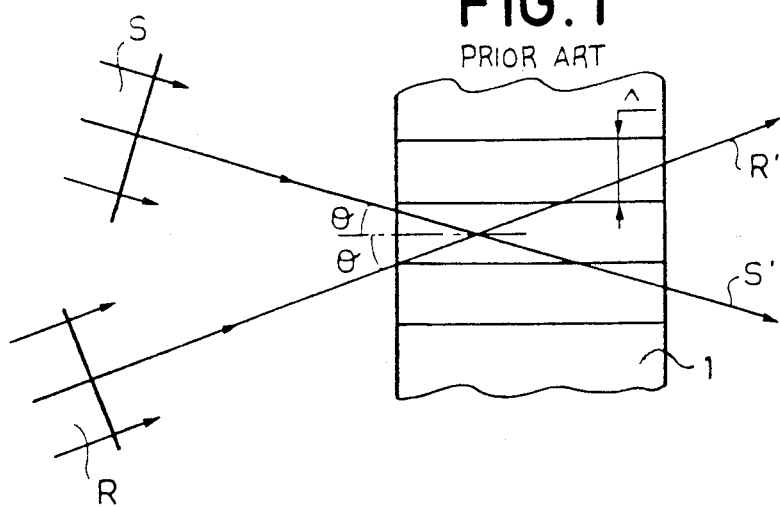
FIGS. 1 to 3 illustrate the operation of an amplifying medium of the prior art.

If, as in FIG. 1, said grating is illuminated by two coherent plane waves R and S emerging from the same laser and having the same intensity, we have the relation $\Lambda = \lambda/2 \sin \theta$.

The pitch $\Lambda$ resulting from the interference of R and S is strictly identical with that of the phase grating and it is precisely these beams R and S which have been utilized for the fabrication of the strata grating which was written beforehand.

Thus, within the thickness of the medium considered, the object wave S has interfered with a reference wave R having a plane wave front. An interference fringe pattern thus formed has generated a refractive-index strata grating structure within the crystal. This strata grating structure diffracts part of the energy of the reference wave R in a diffracted wave S', the wave front of which is isomorphous with the object wave front.

Thus, in accordance with the formalism of coupled waves, a redistribution of energy takes place between the two beams after traversal of the crystal. This new energy distribution is a function of the relative phase shift $\Psi$ between the two waves.

The following notations will be used:
$I_R$, $I_S$: the intensity of the two interfering waves;
$I_{R'}$, $I_{S'}$: the intensity of the two waves at the exit of the crystal;
$\Psi$: the phase shift of the light intensity with respect to the photoinduced phase grating;
$\eta$: the diffraction efficiency of the structure.

The intensities $I_S$ and $I_R$ are obtained respectively by means of the following relations:

$$I_{R'} = I_R(1-\eta) + I_S - 2\sqrt{I_R(1-\eta) I_S \eta} \sin \psi$$

$$I_{S'} = I_R(1-\eta) + \eta I_S + 2\sqrt{I_R(1-\eta) I_S \eta} \sin \psi$$

In the particular case of the figure $I_R = I_O$, hence:

$$I_{R'} = I_O[1 - 2 \times \sqrt{\eta(1-\eta)} \sin \psi]$$

$$I_{S'} = I_O[1 + 2 \times \sqrt{\eta(1-\eta)} \sin \psi]$$

The energy transfer is therefore optimum when the following conditions are satisfied simultaneously:
$\eta = 50\%$; $\Psi = \pi/2$ In this case, there is obtained after traversal of the phase grating:
$I_{R'} = 0$; $I_{S'} = 2I_O$ The physical interpretation of the phenomena is as follows: the incident wave R is diffracted by the three-dimensional phase grating. The wave S' thus generated has, for example, a phase lag of $\pi/2$ with respect to the reading wave R. In a medium 1 in which two waves interfere, there is in fact a phase shift of $\pi/2$ between the interference pattern 31 of the two beams and the phase grating 30 as shown in FIG. 2.

On the other hand, the wave R' which is generated by diffraction of the wave S would have a phase lead of $\pi/2$ with respect to the same wave S.

By reason of the introduction of a phase shift $\Psi = \pi/2$ between the two waves R and S which arrive on the medium 1, coherent phasing of the generated wave S' and of the incident wave S therefore takes place. The phase shift is in fact zero in the case of the wave S' as shown in FIG. 3. On the other hand, in the case of the wave R', the resultant phase shift with respect to the wave R is $\pi/2 + \pi/2 = \pi$. In consequence, there is a destructive interference in the direction of the beam R and therefore a reduction in the energy directly transmitted along R'.

The optimum conditions for transfer of energies are satisfied with the following experimental conditions:
$\eta = 50\%$; $I_R = I_S = I_O$; $\Psi = \pi/2$
and therefore the gain of $I_{S'}/I_S$ is equivalent to 3 dB.

These conditions are satisfied with a medium 1 made of gelatin, for example.

A device of the prior art based on the wave-coupling phenomena described earlier is illustrated in FIG. 4. This device has the function of amplification and oscillation of a coherent optical image. The amplifying medium 1 is constituted by a photorefractive material which operates by photoinduced index variation. The addition of a negative feedback loop constituted by mirrors $M_1$, $M_2$ and lenses $L_1$, $L_2$ makes it possible to constitute a multimode optical cavity and to maintain a stable oscillation of the image within the cavity.

The coherent interference of an incident signal wave S with a reference wave R placed outside the axis and having a much higher intensity is carried out within the amplifying medium 1. Under these conditions, a diffracting phase structure is written throughout the volume of said medium 1. The time constant of establishment of said diffracting phase structure depends both on the power available on the reference wave and on the physical mechanisms utilized within said medium 1. By means of a mechanism of auto-diffraction of the reference wave R in the phase grating which it has just written, it is possible to obtain enhanced amplitude of the incident signal wave S and therefore an amplification after traversal of the medium 1. This wave-coupling phenomenon is caused by the non-local response of the medium under the action of illumination of the interference fringes. This spatial shift between the photoinduced index variation and the illumination can be induced:

either by displacement of the strata at constant velocity;

or by a change of refractive index under the action of the illumination gradient (mechanism of scattering of photocarriers).

The first type of operation can be contemplated with materials such as bismuth silicon oxide, bismuth germanium oxide and the second type of operation can be contemplated with materials such as potassium niobate or barium titanate.

The transmitted intensity is then expressed in the form:

$$I_T = I_S \exp \Gamma - \alpha \times l$$

$\Gamma$ = exponential gain coefficient
$\alpha$ = absorption coefficient
l = length of interaction.

The prior art device considered in the foregoing permits the use of this optical parametric amplifier in which all the beams are at the same frequency so as to realize a multimode oscillator which is compatible with an image signal.

In this device of the prior art as shown in FIG. 4, there is a laser cavity composed of the following elements: two mirrors $M_1$ and $M_2$ between which the object wave circulates, and an amplifying medium 1 located on the path of said object wave. Two lenses $L_1$ and $L_2$ serve to define the path of said object wave within the cavity. The mirror $M_1$ is partially reflecting and semitransparent, for example, and permits entry of the object wave into the cavity; the input signal can accordingly be suppressed.

The diagram of the optical cavity employed and based on the Fourier transform properties of lenses is indicated in FIG. 4. In fact, the plane P' is the focal plane which is common to the two lenses $L_1$ and $L_2$ and this is the Fourier plane of the cavity. The input signal is constituted by a diapositive or any other electrooptical transducer which may be employed for the composition of the image in real time. It may also be any three-dimensional object illuminated by a coherent light beam, the image of which is brought back in one plane.

The amplifying medium 1 is placed in the vicinity of the Fourier plane of the lens $L_1$, thus making it possible to process the spectrum of the image. The lens $L_2$ and the mirror $M_2$ enable the emergent wave from the amplifying medium 1 to return to the photorefractive medium after reflection from the semitransparent mirror $M_1$.

The mirror $M_1$ has the double function of introducing the signal of the incident image and reflecting the amplified wave which rotates within the cavity. Another semitransparent plate $M_3$ serves to extract a part of the energy contained within the cavity whilst the lens $L_3$ permits projection of the image in a plane P.

The oscillator condition of this cavity is ensured if the gain of the amplifying medium 1 is higher than the cavity losses produced in particular by the mirrors $M_1$, $M_2$ and by reflections from the optical components.

In this device, the wave which propagates within the cavity must satisfy well-determined phase conditions at the cavity input. In fact, in order that the grating written in the amplifying medium 1 should stabilize at each traversal, the written grating must therefore be superposed on the grating which has previously been written.

In consequence, and as shown in FIG. 4, the distance between the mirrors $M_1$ and $M_2$ is four times the focal distance f of the lenses $L_1$ and $L_2$ which must be identical. Consideration may accordingly be given to the different characteristics of the device in accordance with the invention.

If writing is performed in a photorefractive medium having a photoinduced index variation, the interference pattern is generated by a reference wave $I_{ro}$ (or pump wave) and a signal wave $I_{so}$ of low intensity ($I_{ro} >> I_{so}$). If the refractive-index variation is caused to undergo a spatial shift of $\Lambda/4$ ($\Lambda$ where is number of fringes) with respect to the interference pattern, the autodiffraction effects ensure redistribution of light intensity after passing through the crystal. Under these conditions, the intensity of the signal wave is written as follows:

$$I_s = I_{so} \exp (\Gamma - \alpha) l$$

$\Gamma$: exponential gain coefficient
$\alpha$: absorption coefficient
l: length of interaction And $\Gamma$ is related to the maximum photoinduced index variation $\Delta n_s$ by the relation:

$$\Gamma = \frac{4 \pi \Delta n_s}{\lambda}$$

Depending on the materials employed, a coefficient $\Gamma$ within the range of 1 to 10 cm$^{-1}$ has been measured experimentally.

The spatial shift between the interference pattern and the change of refractive index is obtained:

either by zero-field recording (scattering of carriers) in barium titanate (Ba TiO$_3$), for example;

or by displacement of the interference fringes at a velocity $V_o$ such that $2\pi/\Lambda \times V_o \times \tau = 1$: recording in an applied field $E_o$ in crystals of bismuth silicon oxide (B S O), for example.

In the case of crystals of bismuth silicon oxide (B S O) and barium titanate (Ba TiO$_3$), image amplifications of the order of 10 have been demonstrated in the laboratory ($I_s/I_{so} > 10$).

Figure 5:
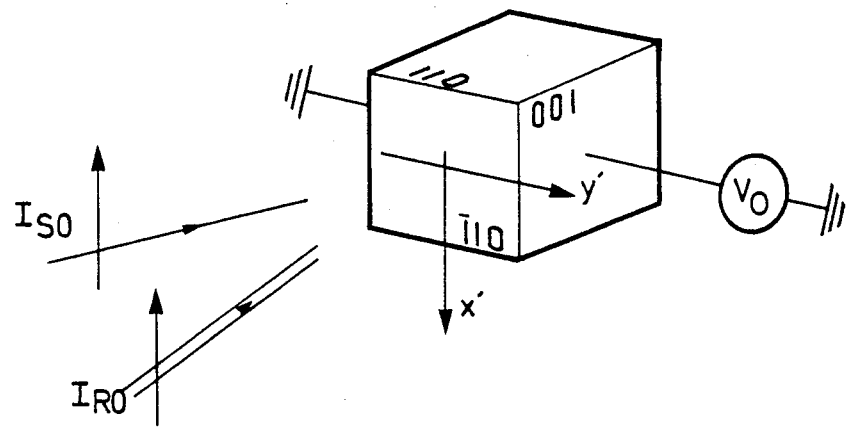
FIGS. 5 to 7 illustrate different characteristic features of the invention.

A study of wave-coupling effects in crystals of bismuth silicon oxide (B S O) has shown different parameters resulting in an advantageous value of the coefficient of exponential gain. It is important in the case of this crystal to maintain these optimum conditions since the value of the electrooptical coefficient is relatively low in comparison with that of barium titanate (Ba TiO$_3$). As shown in FIG. 5, the electric field is applied in the direction 001 of the crystal. The electrooptical axis is in the vertical direction X'.

Polarization of the incident waves is accordingly vertical (parallel to the direction X').

Figure 6:
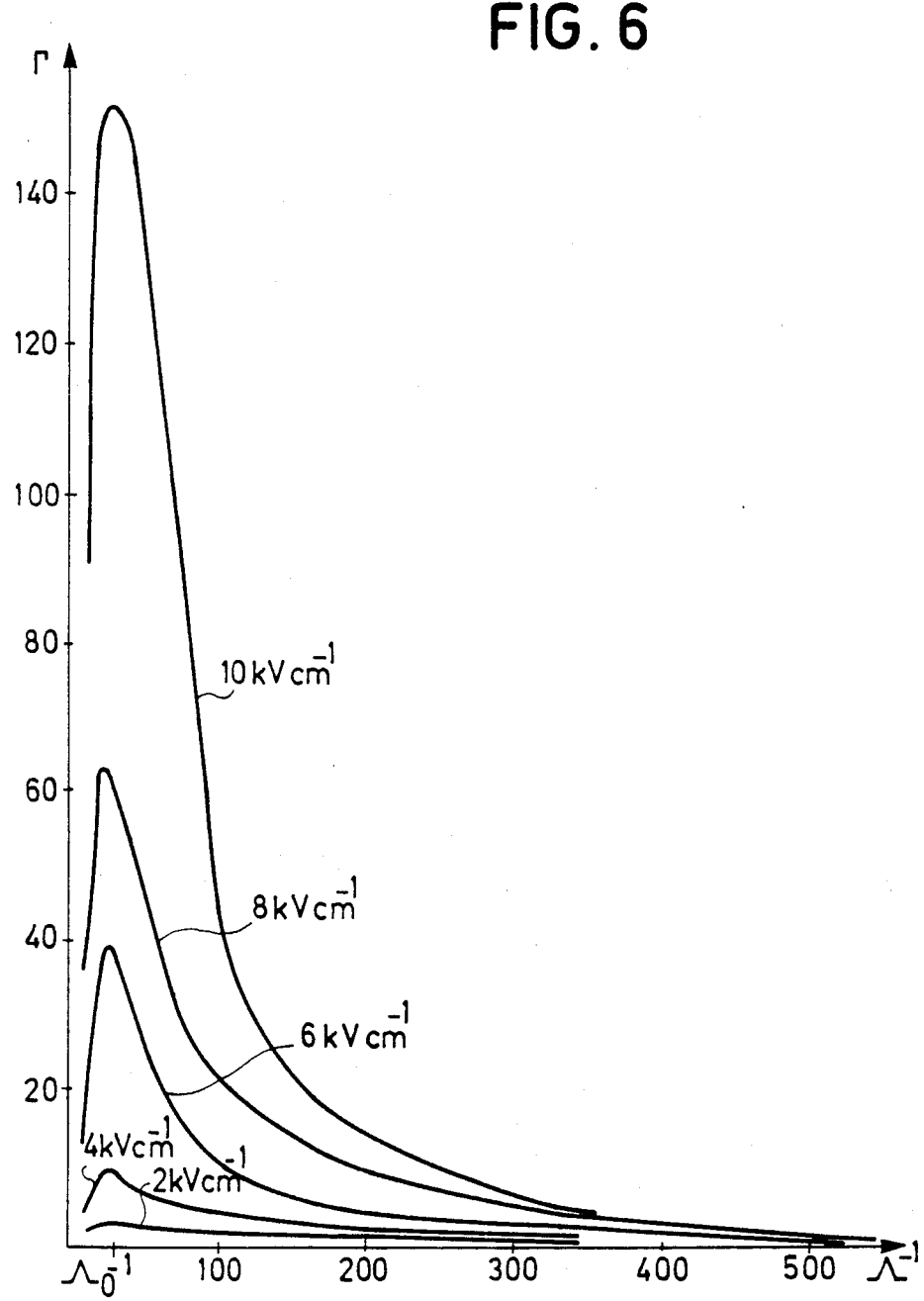

The angle between the two interacting beams is of small value and can be adjusted by referring to the curve of FIG. 6 since it is known that: $\Lambda = \alpha/2 \sin \theta$, where $\Lambda$ is the pitch of strata within the medium.

The device in accordance with the invention operates at low spatial frequencies, namely in respect of a stratum pitch of approximately 20 $\mu$m.

A phase modulator placed on at least one of the reference beams $P_1$, $P_2$ produces a wave frequency translation and therefore a displacement of the interference pattern at a velocity $V_o$. The rate of displacement is chosen so that $2\pi/\Lambda \times V_o \times \tau = 1$.

$\tau$ = time of writing of the photoinduced index variation.

The mean spatial frequency employed is adjusted to the vicinity of an optimum value $\Lambda_o^{-1}$ such as to ensure a maximum exponential gain coefficient $\Gamma$. A study of the variation in the coefficient $\Gamma$ as a function of the spatial frequency $\Lambda^{-1}$ produces the curve shown in FIG. 6.

A resonance of the value $\Gamma$ exists in respect of a value of the pitch of the fringes equivalent to the length L of migration of the photocarriers:

$$\frac{2\pi}{\Lambda} \times L \simeq 1$$

Figure 7:
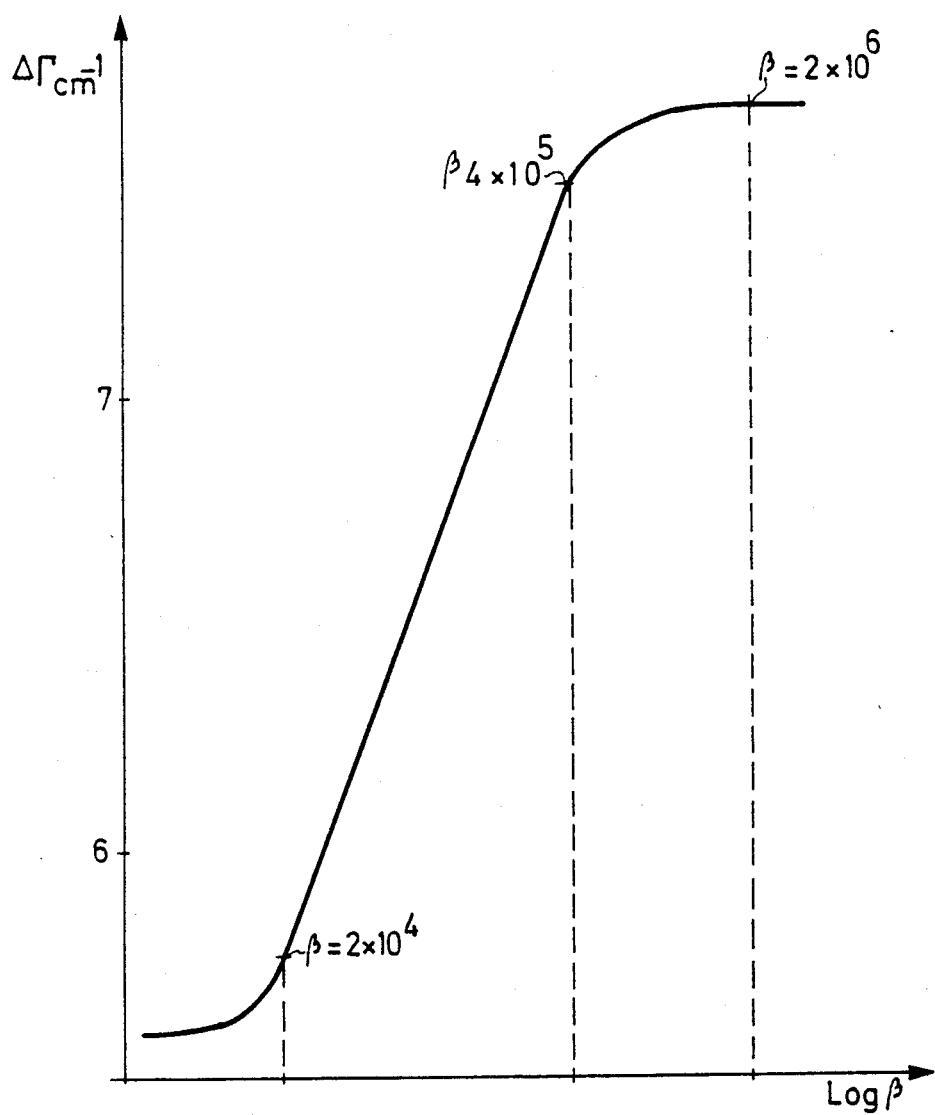

The ratio of the interfering beams in the crystal $\beta = I_{ro}/I_{so}$ is not indeterminate: the curve shown in FIG. 7 indicates higher values of $\Gamma$ in the case of ratios $\beta > 10^3$. Saturation is obtained in respect of $\beta \simeq 10^5$.

The incident wavelength must not correspond to an excessive value of the absorption coefficient $\alpha$. The yellow line of the krypton laser $\lambda = 568$ nm ($\alpha \simeq 0.2$ cm$^{-1}$) constitutes a good compromise for these wave coupling experiments in a bismuth silicon oxide (B S O) crystal. This wavelength permits interaction lengths l of the order of 1 cm without any appreciable losses.

Figure 8:
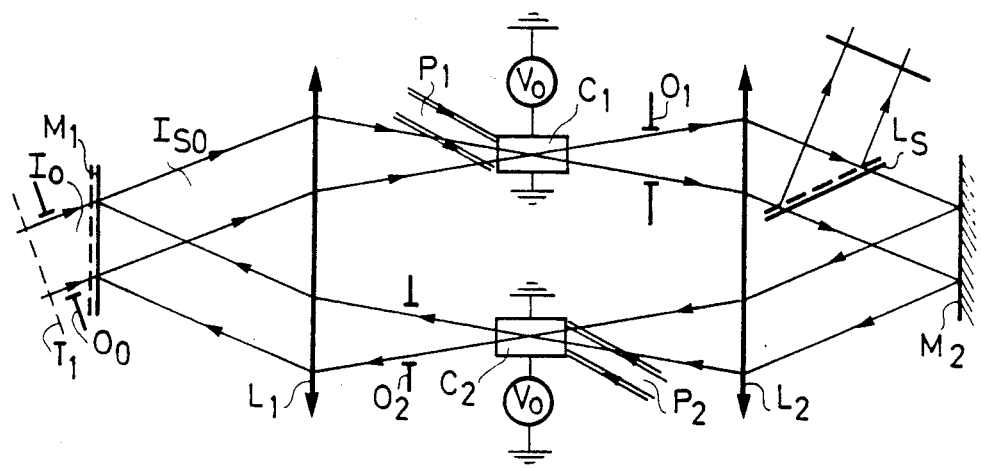
FIG. 8 illustrates the device in accordance with the invention.

The device in accordance with the invention is illustrated in FIG. 8. In this device, use is made of two photorefractive crystals $C_1$ and $C_2$ of bismuth silicon oxide (B S O) located in the Fourier plane of the cavity which operates in the "two-wave" configuration with energy transfer of the pump wave with the signal wave. The optimum conditions of this transfer have been explained earlier (crystal orientation; beam ratios; spatial frequency).

The angles $\theta_1$, $\theta_2$ between the signal wave and the reference beams $P_1$ and $P_2$ are chosen so as to ensure maximum exponential gain coefficients in each crystal $C_1$ and $C_2$ with reference to the curve of FIG. 6 with $$\Lambda_1 = \frac{\lambda}{2 \sin \theta_1} \text{ in } C_1$$

and $$\Lambda_2 = \frac{\lambda}{2 \sin \theta_2} \text{ in } C_2$$

The cycle for circulating the image within the cavity can be described as follows:

the information to be stored is entered by means of the transparent element $T_1$. The electrooptical shutter $O_o$ is in the open state whilst the shutter $O_1$ is closed. The interference pattern corresponding to the pump beam $P_1$ and to the object beam $I_{SO}$ is recorded in the crystal $C_1$.

the shutter $O_o$ is closed. The image is re-read by the reference wave $P_1$. The intensity of the diffracted beam is:

$$I_S = I_{SO} \exp (\Gamma - \alpha) l$$

hence $I_S > I_{SO}$.
Part of the intensity of the diffracted beam is extracted from the cavity by means of the beam-splitter plate $L_S$. The wave is re-recorded in the crystal $C_2$ whilst the shutter $O_2$ is closed.

the image is re-read by the reference wave $P_2$ and re-recorded in the crystal $C_1$ whilst the shutter $O_1$ is closed.

The information therefore passes alternately from crystal $C_1$ to crystal $C_2$. The gain corresponding to each traversal compensates for the losses introduced by the beam-splitter plate $L_S$ as well as by the optical components. In the particular case of bismuth silicon oxide (B S O), the displacement of the interference fringes at the time of recording is carried out by means of a phase modulator placed on the wave $P_1$. This single modulator is sufficient to ensure displacement of the strata for recording both in the crystal $C_1$ and in the crystal $C_2$.

A high degree of amplification of the signals obtained is achieved, thus making it possible to operate with low-strength signals.

The device in accordance with the invention therefore makes it possible to circulate an optical image within a cavity by producing a transfer of information alternately from crystal $C_1$ to crystal $C_2$. This transfer is obtained simply by synchronization of the shutters $O_1$ and $O_2$ (shutter $O_1$ is in the closed state if shutter $O_2$ is open and conversely).

In the device herein proposed there is no condition in regard to the phase since the information is stored alternately in crystal $C_1$ and in crystal $C_2$. The consequences in regard to constructional design of the device are as follows:

no precise tolerances in the position and quality of optical components and of lenses $L_1$, $L_2$ constituting the cavity;

it is also possible to contemplate image transfer from $C_1$ to $C_2$ by means of an ordered bundle of optical fibers;

the time required for completing N revolutions of the cavity is equal to $T = 2 \times N\tau$, namely the time constant of writing of the hologram in the crystal $C_1$ or $C_2$;

an image-processing function can be obtained by placing an amplitude or phase filter in the plane of the spectrum of the incident signal.

Figure 9:
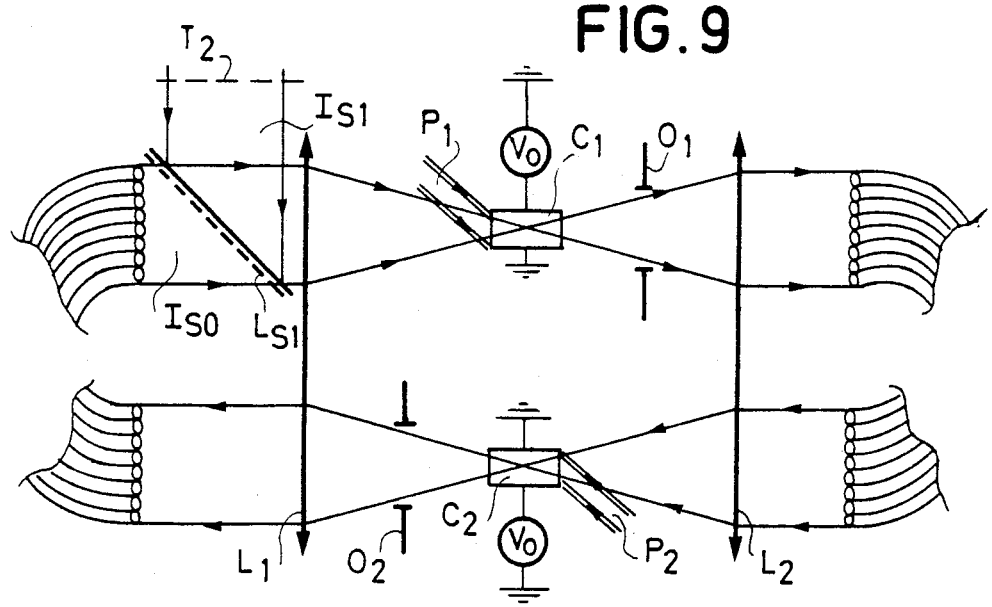
FIG. 9 illustrates an alternative embodiment of the device in accordance with the invention.

FIG. 9 illustrates an alternative embodiment of the device according to the invention in which the mirrors $M_1$ and $M_2$ of FIG. 8 have been suppressed and replaced by bundles of optical fibers.

The semitransparent plate $L_{S1}$ serves to pass into the cavity the object beam $I_{S1}$ which has traversed a transparent element $T_2$, for example.

In this alternative embodiment, the essential difference with respect to the device of the prior art is clearly demonstrated. It is readily apparent that the optical paths in different optical fibers are all different.

By way of example, consideration can be given to elements having the following characteristics:

the crystals $C_1$ and $C_2$ are of bismuth silicon oxide having a thickness of 5 to 10 mm and a surface area of $5 \times 5$ mm$^2$; the voltages $U_1$ and $U_2$ are approximately 6 kV cm$^{-1}$;

the shutters $O_o$, $O_1$, $O_2$ are mechanical or electrooptical shutters of the liquid-crystal type, for example.

In order to utilize the cavity for image processing purposes, an amplitude and phase filter can be placed in the common Fourier plane of the lenses $L_1$-$L_2$. One of the two crystals ($C_1$ or $C_2$) is consequently displaced to a slight extent in order to modify the spatial frequency content of the image. The filter can also be placed in the image plane of the transparent element $T_1$.

The introduction of a phase function $\phi (x, y)$ induces an intensity modulation of the form:

$$I_T = I_o \times T_1 \times R_3 \frac{\exp \Gamma \, 1}{1 - T_3 R_1 \exp \Gamma \frac{1}{2} \sin^2 \phi(x, y)}$$

A transfer function of this type permits non-linear operations on images.

In order to erase the information stored in the cavity, the photorefractive crystals are uniformly illuminated by the reference waves (or pump wave) $P_1$ and $P_2$, thus relaxing the photoinduced index variation whilst the two shutters are maintained in the closed position.

Different materials can be employed as amplifying media within the cavity. The photorefractive materials constitute an advantageous solution for coherent amplification of images by energy transfer from a pump wave. The crystals employed are as follows: potassium niobate ($KNbO_3$), barium titanate ($BaTiO_3$), bismuth silicon oxide ($Bi_{12}SiO_{20}$), bismuth germanium oxide ($Bi_{12}GeO_{20}$). In the case of each of these crystals, coherent amplification of an image has been obtained with gains of the order of 5 to 1500. The exceptionally high values ($\simeq 1500$) of gain are obtained with crystals of barium titanate ($BaTiO_3$) and bismuth silicon oxide (B S O) in respect of a particular electrooptical orientation of these materials. The writing energies required in the visible region are typically of the order of 100 $\mu J \, cm^{-2}$ in the case of bismuth silicon oxide to 100 m J $cm^2$ in the case of barium titanate and are therefore compatible with the available power levels obtained from an argon laser.

As a function of the dynamic range of the material considered, the interference system written in said medium can comprise n different gratings but, in that case, the maximum index variation is divided by n and there is less gain in the case of each grating.

There may thus be considered the instantaneous illumination of the crystal by three signal waves at three different wavelengths $\lambda_1$, $\lambda_2$, $\lambda_3$. If one considers three reference waves having the same wavelengths $\lambda_1$, $\lambda_2$, $\lambda_3$, this accordingly results in writing of three gratings at the same time. The device in accordance with the invention therefore makes it possible to store in memory a three-color coherent image.

What is claimed is:

1. A device for recording a coherent image in a multimode optical cavity, comprising a coherent source having a wavelength $\lambda$ which generates a signal wave, optical guiding means for forming a closed loop in which the signal wave circulates, said guiding means being provided with focusing means, wherein said device further comprises two interactive amplifying media placed on the path of the signal wave within the cavity having terminals to which are applied respectively two voltages such that electric fields are in the direction 001 of each crystal, the coherent source being adapted to deliver in addition two reference beams which interfere with the signal wave in each of the two crystals so as to form two diffraction gratings and at least two shutters placed on the path of the signal wave within the cavity, each of said two interactive media being such as to have an optimum exponential gain coefficient, the angles $\theta_i$ formed between the signal wave and each reference beam being determined by the formula $$\Lambda_i = \frac{\lambda}{2 \sin \theta_i}$$

where $\Lambda_i$ is the pitch of the strata within the medium considered, at least one phase modulator being placed on the path of one of the reference beams, said interactive media being placed in the vicinity of the Fourier plane of said cavity, a semitransparent plate being placed on the path of the signal wave in order to extract part of the energy of the multimode optical cavity.

2. A device according to claim 1, wherein the pitch of the strata within the constituted medium has a value in the vicinity of 20 micrometers.

3. A device according to claim 1, wherein the guiding means comprise two plane mirrors whose reflecting surfaces are placed in opposite relation, one of said mirrors being a semitransparent mirror, each signal wave being passed into the cavity via said semitransparent mirror, two lenses, a first lens and at least a second lens being placed between said two mirrors in order to have a common focal plane which is the Fourier plane of the cavity, the incidence of each signal wave at the input being such that said wave reaches the first interactive amplifying medium after passing through the first lens, the optical path of the signal wave within the cavity being closed in a loop so as to pass through the second interactive amplifying medium.

4. A device according to claim 1, wherein a plurality of signal waves at different wavelengths are introduced and circulated within the optical cavity and interfere within the two media with reference waves which have the same wavelengths and are coherent therewith.

5. A device according to claim 4, wherein three signal waves at three different wavelengths are introduced and circulated within the optical cavity and interfere within the two media with reference waves which have the same wavelength and are coherent therewith.

6. A device according to claim 1, wherein the interactive amplifying media are formed of photorefractive material.

7. A device according to claim 6, wherein said photorefractive material is selected from the following materials: potassium niobate, barium titanate, bismuth silicon oxide, bismuth germanium oxide.

8. A device according to claim 1, wherein an amplitude and phase filter is placed in the common focal plane of the two first lenses on the path of the signal wave.

* * * * *